United States Patent
Uchiyama

[19]

[11] Patent Number: 6,006,624
[45] Date of Patent: Dec. 28, 1999

[54] LEVER SWITCH FOR A VEHICLE

[75] Inventor: Norio Uchiyama, Tokyo, Japan

[73] Assignee: Niles Parts Co., Ltd., Japan

[21] Appl. No.: 09/022,888

[22] Filed: Feb. 12, 1998

[30] Foreign Application Priority Data

Jun. 30, 1997 [JP] Japan ..................................... 9-189030

[51] Int. Cl.⁶ .................................................. H01H 3/16
[52] U.S. Cl. ............................ 74/489; 74/527; 200/61.27
[58] Field of Search .................................. 74/489, 502.2, 74/527; 200/61.27, 61.28

[56] References Cited

U.S. PATENT DOCUMENTS

| | | | |
|---|---|---|---|
| 4,599,500 | 7/1986 | Wilcox | 200/61.27 |
| 4,926,688 | 5/1990 | Murasaki | 74/527 |
| 4,929,806 | 5/1990 | Furuhashi et al. | 200/61.27 |
| 5,150,633 | 9/1992 | Hillgartner | 74/527 |
| 5,733,006 | 3/1998 | Woods | 74/527 |
| 5,808,546 | 9/1998 | Hayase et al. | 200/61.27 |

FOREIGN PATENT DOCUMENTS 2-137724  11/1990  Japan .

*Primary Examiner*—Thomas R. Hannon
*Assistant Examiner*—Chong H. Kim
*Attorney, Agent, or Firm*—Rader, Fishman & Grauer; Ronald P. Kananen

[57] ABSTRACT

In order to enlarge a stroke of a movable piece displaced by pivoting a lever in upward and downward directions, a lever switch for a vehicle according to the present invention has a lever mounted pivotably on a case, and a movable piece moved by pivoting movement of the lever. An arm body is disposed between the case and the movable piece. In the arm body there are a shaft portion supported pivotably by the case at one end, a thrusting portion driving the movable piece at the other end, and a contacting portion brought into contact with the lever at an approximately central part. The arm body includes a first arm, at an extremity of which the shaft portion is disposed, a second arm, at an extremity of which the contacting portion is disposed, and a third arm, at an extremity of which the thrusting portion is disposed. In the arm body, the shaft portion is disposed in an approximately horizontal direction from a nearly central point O, the contacting portion is disposed in an approximately vertical direction from the nearly central point O, and the thrusting portion is formed in an inclined direction from the nearly central point O.

9 Claims, 4 Drawing Sheets

LEVER SWITCH FOR A VEHICLE

BACKGROUND OF THE INVENTION

1. Field of the Invention

The present invention relates generally to lever switches for vehicles. More particularly, the present invention relates to a construction of a lever switch for a vehicle provided with an arm capable of enlarging a stroke of a movable piece moved by pivoting a lever upward and downward.

2. Description of the Related Art

A conventional lever switch is disclosed, for example, in Japanese Utility Model No. A-Hei 2-137724. The conventional lever switch has a slider hole, with which an operation lever is engaged, formed in a direction inclined with respect to a horizontal direction of the slider. As a result, a stroke of the slider is enlarged.

However, in the conventional lever switch described above, if a long stroke of a movable plate is desired, the movable plate must have a great thickness. Therefore, the conventional lever switch has a problem in that the movable plate is large, and the size of the whole switch is increased.

SUMMARY OF THE INVENTION

An object of the present invention is to provide a lever switch for a vehicle that solves the problems associated with the conventional lever switch described above.

More specifically, an object of the present invention is to provide a lever switch for a vehicle, in which without increasing the size of the movable plate, the movable plate has a long stroke, owing to the fact that an arm body is provided for enlarging the stroke of the movable plate.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch for a vehicle is provided having a lever mounted pivotably on a case and a movable piece moved by pivoting movement of the lever. The lever switch is characterized by an arm body disposed between the case and the movable piece, in which arm body there are a shaft portion supported pivotably by the case at one end; a thrusting portion driving the movable piece at the other end; and a contacting portion brought into contact with the lever at an approximately central part thereof.

In the invention above described, the arm body preferably includes a first arm, at an extremity of which the shaft portion is disposed; a second arm, at an extremity of which the contacting portion is disposed; and a third arm, at an extremity of which the thrusting portion is disposed.

Further, in the preferred embodiment of the invention above described, in the arm body, the shaft portion is disposed in an approximately horizontal direction from a nearly central point; the contacting portion is disposed in an approximately vertical direction from the nearly central point; and the thrusting portion is formed in an inclined direction from the nearly central point.

In addition, in the preferred embodiment of the invention above described, the arm body is constructed such that L1 <L2, where L1 denotes a length from the shaft portion to the contacting portion, and L2 denotes a length from the shaft portion to the thrusting portion.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A preferred embodiment of a lever switch according to the present invention will now be described in detail with reference to FIGS. 1 to 6 of the accompanying drawings.

Figure 1:
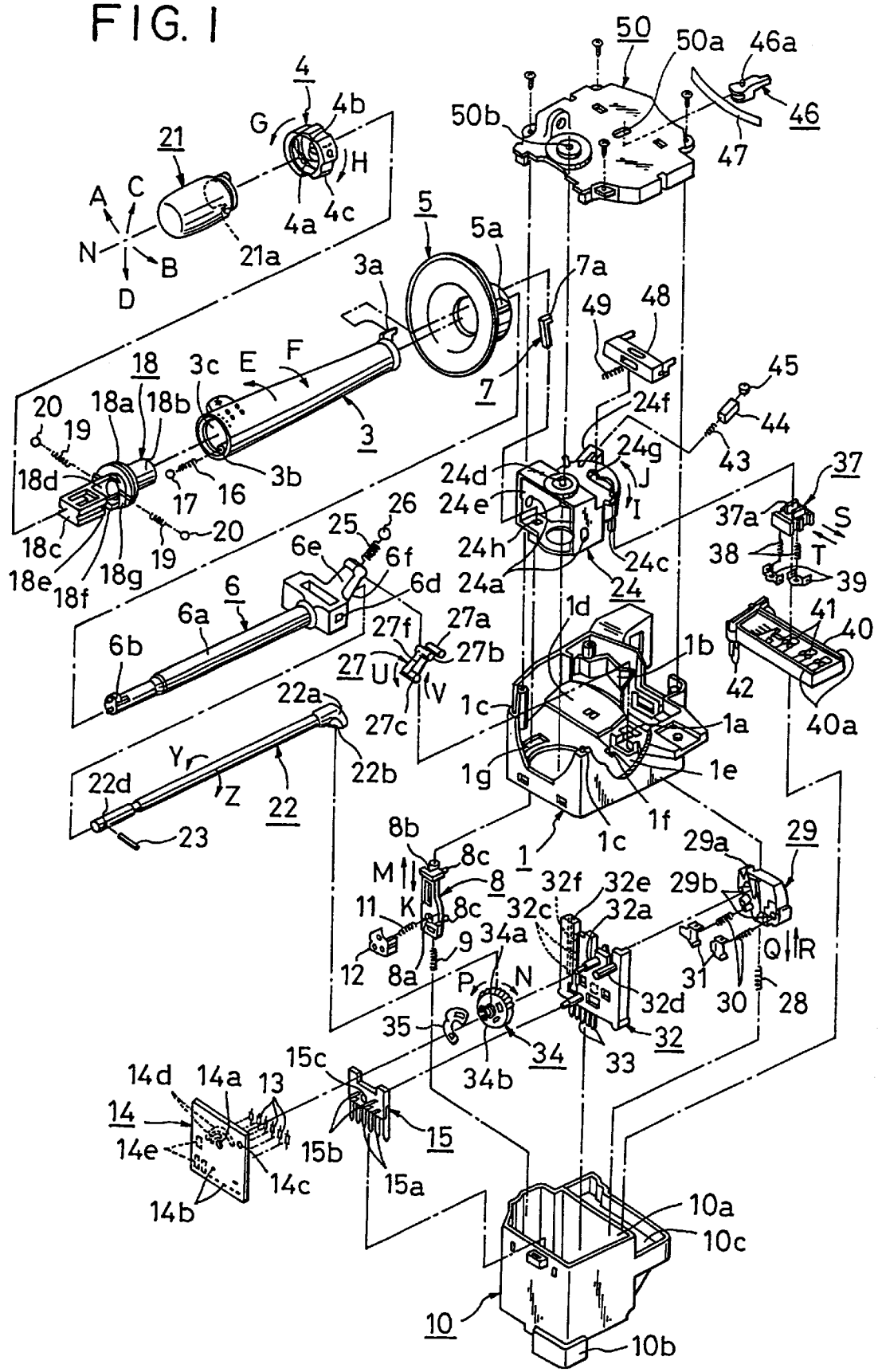
FIG. 1 is an exploded perspective view showing a lever switch according to a preferred embodiment of the present invention.
Figure 2:
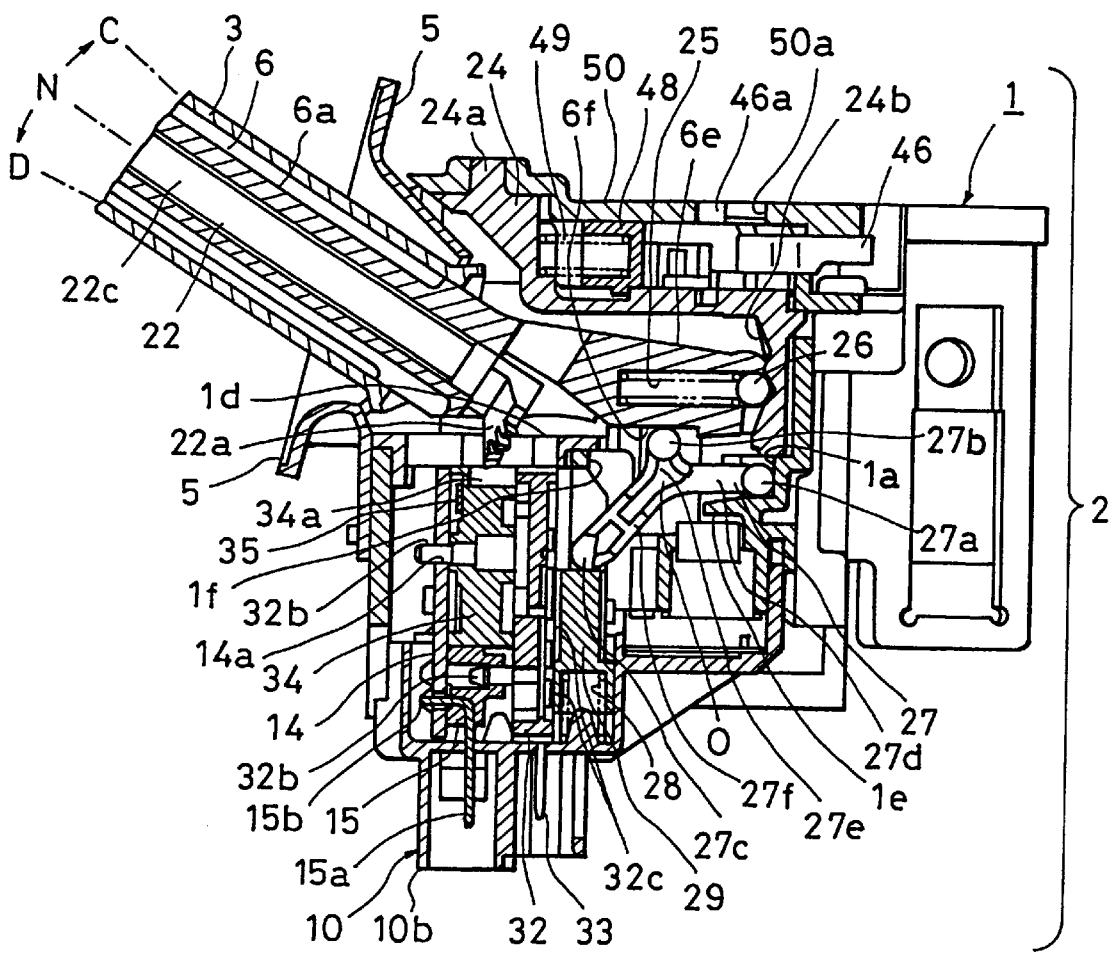
FIG. 2 is an enlarged longitudinal cross-sectional view of a principal part of the lever switch according to the present invention.
Figure 3:
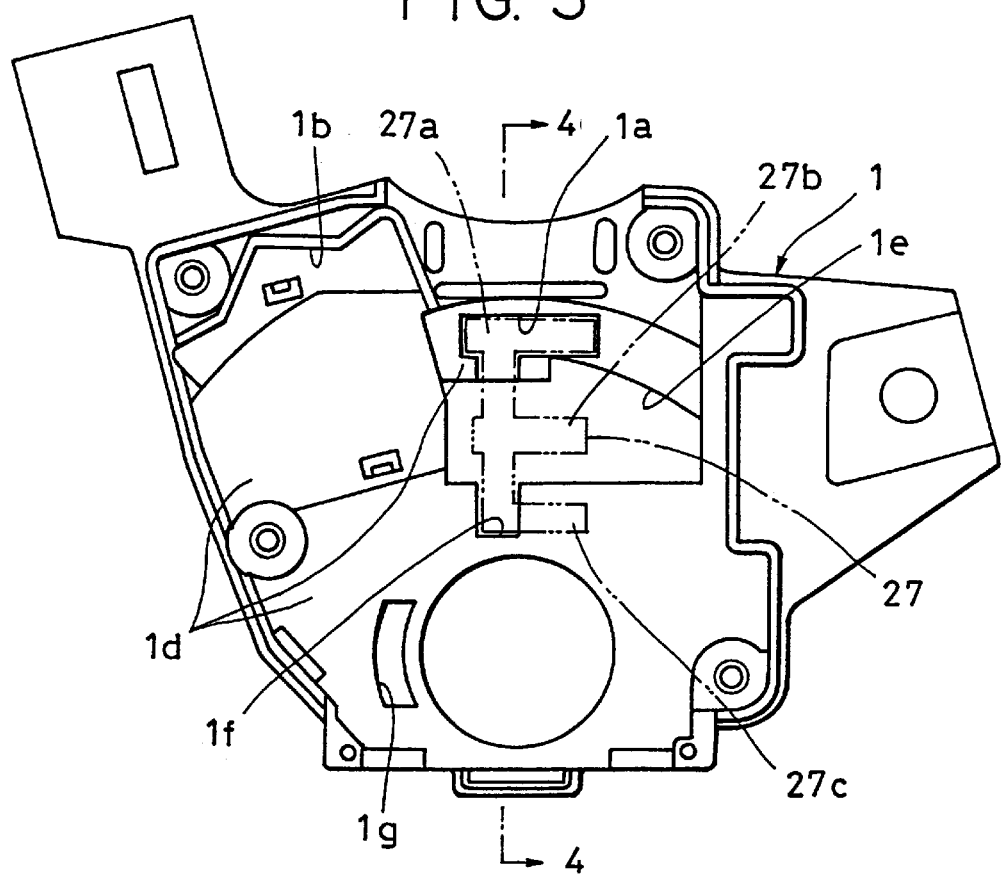
FIG. 3 is an enlarged plan view of a case for the lever switch according to the present invention.
Figure 4:
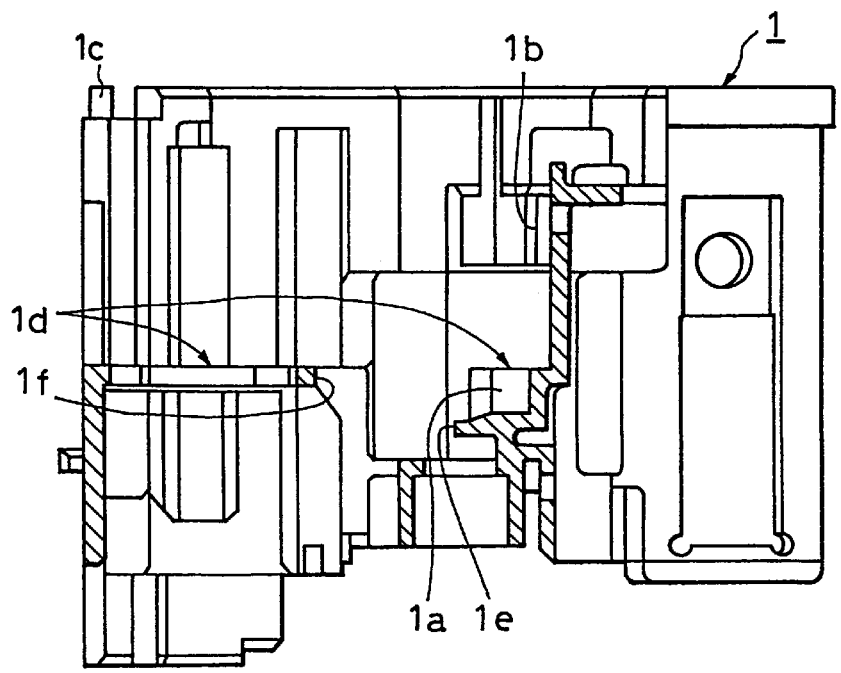
FIG. 4 is a cross-sectional view taken along a line 4—4 in FIG. 3, as viewed in a direction indicated by arrows, showing the case for the lever switch according to the present invention.
Figure 5:
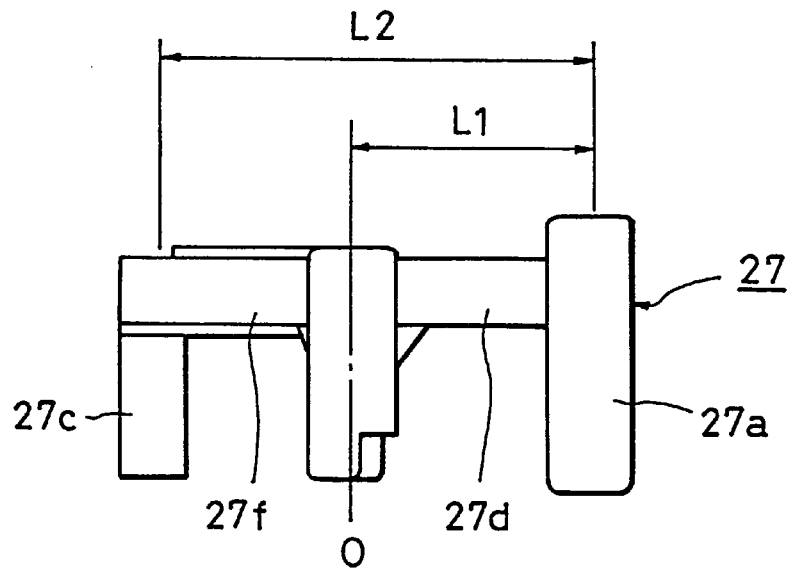
FIG. 5 is an enlarged plan view of an arm body used in the lever switch of the present invention.
Figure 6:
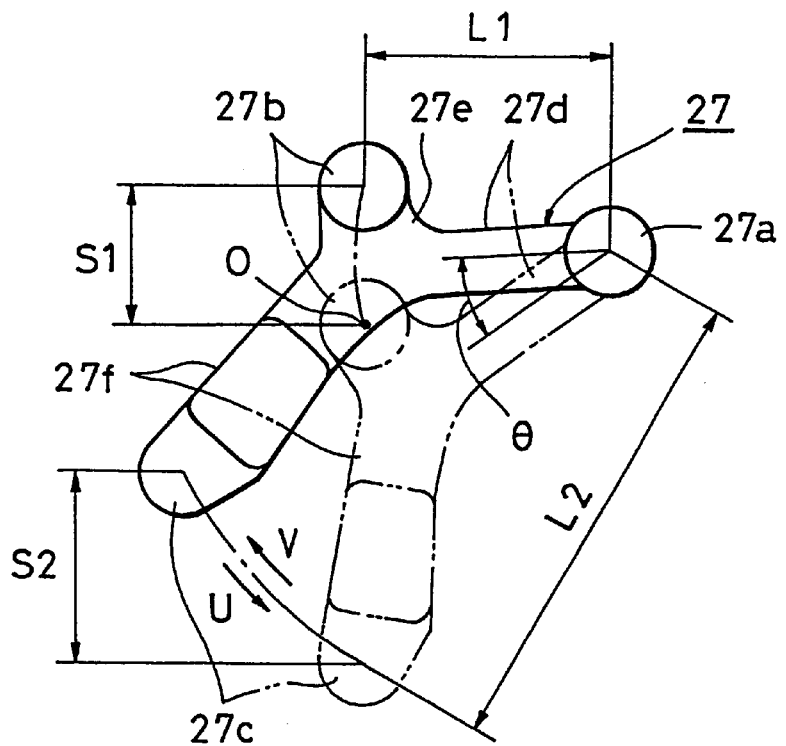
FIG. 6 is a diagram indicating a pivoting state of the arm body used in the lever switch of the present invention.

A case 1 of a combination switch 2 for a vehicle is mounted, for example, on the left side of a body (not shown in the figures). The case 1 and the combination switch 2 shown in FIGS. 1 and 2 are a switch mounted in the neighborhood of a steering wheel. A switch for a left steering wheel type vehicle will be described in detail below as a mode of realization of the present invention. If the switch according to the present invention is to be used for a right steering wheel type vehicle, the same teachings can be applied by inverting symmetrically the left and the right sides of the case 1, the combination switch 2, and all the other parts described later.

The body has a cylindrical pipe into which a steering shaft (not shown in the figures) is inserted at the center. For example, the case 1 is inserted from the left to be mounted on the left side thereof and secured to a steering column (not shown in the figures) by means of screws.

The combination switch 2 is provided with functions of, for example, a turn signal switch, a passing switch, a main-dimmer switching-over switch, and a wiper-washer switch. The combination switch 2 functions as the turn signal switch, wherein turn indicator lights are lightened and extinguished, when a first lever 3 is operated in the left and right directions, as indicated by arrows A and B.

The combination switch 2 functions as the passing switch, wherein head lamps are temporarily lightened, when the first lever 3 is operated upward, as indicated by an arrow C. The combination switch 2 functions as the main-dimmer switch, wherein the main-dimmer switching over of the head lamps is effected, when the first lever 3 is operated in upward and downward directions, as indicated by arrows C and D.

Moreover, the combination switch 2 functions as a wiper switch for driving wipers three or four times, and functions as the wiper-washer switch, wherein washer liquid is sprayed to a front glass, when the first lever 3 is operated by pivoting in a direction indicated by an arrow E. A pivoting knob 4 disposed on the extremity side of the first lever 3, adjacent thereto, operates a wiper switch function of the combination switch 2, wherein wipers are driven at different speeds and intermittently, when the pivoting knob 4 is operated by pivoting in a direction indicated by arrows G or H.

The first lever 3 has an approximate cylindrical shape having a greater diameter at one end portion on the side of the pivoting knob 4, and a smaller diameter at the other end portion on the side of the case 1. A boot 5 having a spreading mouth in a trumpet shape is mounted freely and movably around the end portion of the first lever 3 on the side of the case 1. A second lever 6 made of a pipe is inserted into the spreading mouth of the boot 5. The first lever 3 pivots around shaft portions 6d of the second lever 6 in the direction indicated by an arrow E to operate the wiper washer switch, and returns automatically in a direction indicated by an arrow F.

An operating rod 3a contacted with pressure with a push rod 7 driving a first movable piece 8 in the upward and downward directions, as indicated by arrows K and M, is disposed at the end portions of the first lever 3 on the side of the case 1, and protruding therefrom. The operating rod 3a is a protruding piece formed on the other end portion of the first lever 3, which is pivoted together with the first lever 3 and pushes a head portion 7a of the push rod 7 to move it upward and downward.

The push rod 7 is an approximately L-shaped metal bar-shaped member having the head portion 7a. The push rod 7 is inserted to be supported movably upward and downward into a pipe-shaped portion 24h formed on a bottom surface of an opening portion 24e of a movable plate 24. The pipe-shaped portion 24h, into which the push rod 7 is inserted, is inserted and disposed pivotably in a horizontal direction into a through-hole 1g formed in an inner bottom surface 1d of the case 1. The push rod 7 is thrust by the first movable piece 8 and energized by a returning spring 9 so that the head portion 7a is always contacted with pressure with the operating rod 3a.

The boot 5 is mounted on the case 1 so that a driver of the vehicle cannot see directly a base portion 6c of the second lever 6 and the movable plate 24. A protruding portion 1c of the case 1 is inserted into a through-hole 5a disposed on a lower surface on the rear surface side of the boot 5. The boot 5 is fixed by being placed between the case 1 and a cover member 50.

The first movable piece 8 is engaged with the push rod 7, which is made of metal or the like, at an upper portion. The first movable piece 8 is disposed on an inner bottom of an opening portion 10a of a pole plate 10 through a returning spring 9. Further, the movable piece 8 holds a movable contacting plate 12 through a contact spring 11 on a side surface. A blind hole 8a is formed in a side surface portion of the first movable piece 8 on the side of a first base plate 14. The contact spring 11 is immersed in the hole 8a. Another blind hole (not shown in the figures), in which the returning spring 9 is immersed, is formed in the lower surface portion of the first movable piece 8.

A cut-out groove 8b is formed in an upper surface portion of the first movable piece 8. A lower end portion of the push rod 7 is inserted into the cut-out groove 8b. A plurality of guiding protrusions 8c engaged with guiding grooves 32e formed vertically in the second base plate 32 are formed in the upper and lower portions of the first movable piece 8 on the side of the second base plate 32. When the first lever 3 is operated by pivoting, the first movable piece 8 is pushed by the push rod 7 to be moved upward and downward. The first movable piece 8 is guided by a guiding groove 32e in directions indicated by arrows K and M. When the movable contacting plate 12 is brought into contact with a fixed contact 14e, the wiper washer switch is turned-on to drive the wiper washer.

The first base plate 14 is a printed board. Fixed contacts 14d and 14e are printed on the first base plate 14, and electronic elements 13 and welded parts 15b of a terminal plate 15 are welded on the first base plate 14. Further, the fixed contacts 14d and 14e may be made of metal pieces, which are fixed to the first base plate 14 by caulking. The electronic elements 13 consist of resistors and other electronic elements that make up an intermittent wiper circuit, and so forth. The welded parts 15b, each of which forms one body with a terminal 15a, are formed by inserting them into the terminal plate 15. The first base plate 14 and the terminal plate 15 are inserted into the opening portion 10a to be held by putting them between a lever surface of the inner bottom surface 1d of the case 1. The first base plate 14 and the terminal plate 15 are further secured by inserting the terminals 15a into a connector portion 10b.

The first base plate 14 is, for example, a printed board, in which there are formed a shaft hole 14a and through-holes 14b and 14c. The shaft hole 14a supports a shaft bar 32a described later. The welded parts 15b of the terminals 15a are inserted into the through-holes 14b. An engaging protrusion 2b of the second base plate 32 is engaged with the through-hole 14c. The fixed contacts 14d and 14e and the terminal plate 15 are secured to a front surface of the first base plate 14, on which the first movable piece 8 is disposed. The fixed contacts 14d are arranged in an arc shape in two rows around the shaft hole 14a. The fixed contacts 14e are located at positions, where the movable contacting plate 12 is brought into contact therewith, when the first lever 3 is operated by pivoting so that the movable contacting plate 12 is lowered.

The terminals 15a protrude from the lower surface of the terminal plate 15. The welded parts 15b, each of which is made in one body with a terminal 15a, protrude from a side surface of the terminal plate 15. In this way, the terminal plate 15 is formed by inserting the terminals 15a and the welded parts 15b into the terminal plate 15. A through-hole 15c, with which the shaft bar 32a protruding from the second base plate 32 is engaged, is formed approximately at the center of the terminal plate 15. The terminal plate 15 is fixed by the lower end portion being engaged with the inner bottom of the opening portion 10a. At the same time, the terminals 15a are inserted into the connector portion 10b, and the shaft bar 32a is mounted on the through-hole 15c by insertion.

A blind hole 3b, in which a steel ball 17 and a node spring 16 are immersed, is formed on the inner side of the opening portion 3c of the first lever 3 on the side of the pivoting knob 4. The steel ball 17 is energized by the node spring 16 and contacted with pressure with a node groove (not shown in the figures) formed in a side surface portion of a flange portion 18a. The flange portion 18a is disposed approximately at the center of a fixed body 18 on the side of the first lever 3. The steel ball 17 functions to return automatically the first lever 3.

The fixed body 18 is inserted into the opening portion 3c of the first lever 3. The fixed body 18 has a cylindrical portion 18b, the flange portion 18a, and an engaging portion 18c. The extremity of a pipe-shaped portion 6a is inserted into the cylindrical portion 18*b*. Node springs 19 and steel balls 20 are disposed in the flange portion 18*a* so that they can be easily taken-out towards the outer periphery. The engaging portion 18*c* is used for fixing a fixed knob 21.

The fixed body 18 is secured to the second lever 6 by an elastic engaging nail 6*b* at the extremity of the pipe-shaped portion 6*a* inserted into the first lever 3. The cylindrical portion 18*b* is engaged with the periphery of the cut-off portion 18*d* adjacent to the flange portion 18*b*. The pipe-shaped portion 6*a* is inserted into the first lever 3 freely movably so that the first lever 3 is disposed pivotably on the second lever 6 owing to the fact that there are disposed the base end portion 6*c* at one end and the flange portion 18*a* at the other end.

Blind holes 18*g*, into which the node springs 19 and the steel balls 20 are inserted, are formed in the outer peripheral portion of the flange portion 18*a*. In addition, the pivoting knob 4 is disposed around the flange portion 18*a*. Node grooves 4*a*, with which the steel balls 20 are contacted with pressure, and a protrusion 4*b*, which is slidingly in contact with the side surface of the flange portion 18*a*, are formed on the inner surface of the pivoting knob 4. Further, a protruding piece 18*e*, which is engaged with a guiding groove (not shown in the figures) formed in the interior of the fixed knob 21, and a nail 18*f*, which is engaged with an engaging piece 21*a* disposed at the opening end of the fixed knob 21, are formed on the engaging portion 18*c*.

The shaft portions 6*d* fitted to the shaft hole 24*a* formed in the movable plate 24 protrude from both sides of the base end portion 6*c* of the second lever 6. The second lever 6, the first lever 3, and a third lever 22 pivot around the shaft portions 6*d* in the directions indicated by the arrows C and D. The shaft portions 6*d* protrude from one side of the base end portion 6*c*. A node body disposing protrusion 6*e* is also formed on the base end portion 6*c*, into which a node spring 25 and a steel ball 26 are inserted. The steel ball 26 energized by the node spring 25 is contacted with pressure with a node groove 24*b* formed in an inner wall of the movable plate 24, as indicated in FIG. 2.

A thrusting surface 6*f* thrusting a contacting portion 27*b* of an arm body 27 is formed on the lower side of the node body disposing protrusion 6*e*. When the first lever 3 is operated in the directions indicated by the arrows C and D, the second lever 6 moves upward and downward around the shaft portions 6*d* so as to pivot the arm body 27.

The arm body 27 consists of a shaft portion 27*a*, the contacting portion 27*b*, and a thrusting portion 27*c*, as well as a first arm 27*d*, a second arm 27*e* and a third arm 27*f* linking them. The shaft portion 27*a* having an approximately circular cylinder shape of the arm body 27 is fitted to a shaft supporting groove 1*a* formed in the case. The arm body 27 is supported pivotably by putting it between the case 1 and the lower surface of the movable plate 24. The arm body 27 has a nearly central point 0.

The shaft supporting groove 1*a* is an approximately T-shaped blind hole, in which the shaft portion 27*a* of the arm body 27 and the first arm 27*d* in the neighborhood of the shaft portion 27*a* are immersed. The groove 1*a* is formed at a corner on the inner bottom surface 1*d* of the case 1. In the case 1, there is formed a through-hole 1*e* in the neighborhood of the shaft supporting groove 1*a*, into which the third arm 27*f* of the arm body 27 and a protrusion 24*c* of the movable plate 24 are inserted so as to be pivotable. A cut-off portion 1*f* is formed at a position opposite to the shaft supporting groove 1*a* on the through-hole 1*e*, through which the third arm 27*f* passes and with which the thrusting portion 27*c* is contacted.

The contacting portion 27*b* has a circular cylindrical shape at a position with which the thrusting portion 6*f* is contacted with pressure. The thrusting portion 27*c* is a part, which engages and moves the second movable piece 29 energized by a spring 28 upward and downward in directions indicated by arrows Q and R. The thrusting portion 27*c* is disposed between the lower surface of the inner bottom surface 1*d* of the case 1 and the second movable piece 29. In this way, the second movable piece 29 energized by the spring 28 is always contacted with the thrusting portion 27*c*.

The first arm 27*d* extends from the shaft portion 27*a* in a horizontal direction, as indicated in FIG. 2. The second arm 27*e* hangs from the thrusting portion 27*b* vertically downward and intersects the first arm 27*d* and the third arm 27*f* therebetween. The third arm 27*f* extends obliquely upward from the thrusting portion 27*c* towards the intersection between the first arm 27*d* and the second arm 27*e*.

The arm body 27 is so constructed that $L1 < L2$, where $L1$ is the length between the shaft portion 27*a* and the thrusting portion 27*b*, and $L2$ is the length between the shaft portion 27*a* and the thrusting portion 27*c*.

In this way, when the arm body 27 is pushed by the thrusting surface 6*f* and pivoted by an angle $\theta$ (see FIG. 6) in directions indicated by arrows U and V around the shaft portion 27*a* at an end thereof, the thrusting portion 27*c*, which is at the other end of the arm body, is moved over a longer distance than the contacting portion 27*b*. That is, since the arm body 27 is between the second movable piece 29 and the second lever 6, the stroke over which the second movable piece 29 moves upward and downward in the directions indicated by the arrows Q and R is increased.

Blind holes 29*b*, into which contact springs 30 are inserted so that they can be freely taken-out therefrom, are formed in a side surface portion of the second movable piece 29, which holds further a movable contacting plate 31 through the contact springs 30. In addition, a blind hole (not shown in the figures), into which the spring 28 is inserted so that it can be freely taken-out therefrom, is formed in a lower surface portion of the second movable piece 29. When the first lever 3 is operated in the directions indicated by the arrows C and D, the second movable piece 29 is pushed by the arm body 27 and moved upward and downward to close and open a switch effecting the main-dimmer switching over and the passing. When the second movable piece 29 is moved upward and downward in the directions indicated by the arrows Q and R, the movable contacting plate 31 is brought into contact with fixed contacts 32*c* disposed on the second base plate 32 to turn-on a switch.

The fixed contacts 32*c* are disposed on a side surface of the second base plate 32 on the side of the second movable piece 29. A guiding groove 32*f* engaged with a guiding protrusion 29*a* of the second movable piece 29 is formed in the second base plate 32. The shaft bar 32*a*, engaging protruding bars 32*b* and 32*d* and a guiding groove 32*e* are formed on the side surface of the second base plate 32 on the side of the first base plate 14. Terminals 33 connected electrically with the fixed contacts 32*c* are formed on the lower surface of the second base plate 32 by insertion so as to protrude therefrom.

The second base plate 32 is put and fixed between the bottom surface of the opening portion 10*a* and the lower surface of the inner bottom surface 1*d* of the case 1 because the lower end portion of the second base plate 32 is mounted on the inner bottom of the opening portion 10*a* of the pole plate 10, and because the case 1 is closed by the opening portion 10*a*. Further, the second base plate 32 is fixed more solidly in the pole plate 10 because the terminals 33 are mounted in the connector portion 10b of the pole plate 10 by insertion, the shaft bar 32a is inserted into the shaft hole 14a formed in the first base plate 14, the engaging protruding bar 32b is inserted into the through-hole 15c, and the engaging protruding bar 32d is inserted into the through-hole 14c.

The shaft bar 32a and the engaging protruding bars 32b and 32d are formed in one body together with the second base plate 32, and are made of, for example, resin or the like. The shaft bar 32a has a length such that the extremity thereof passes through the shaft hole 14a and protrudes from the first base plate 14, as indicated in FIG. 2. The shaft bar 32a may be a shaft made of metal secured to the second base plate 32. Further, the shaft bar 32a and the engaging protruding bars 32b and 32d formed on and protruding from the second base plate 32 may be formed on the first base plate 14 and the terminal plate 15. The first base plate 14 and the terminal plate 15 are opposite to the second base plate 32. The shaft hole 14a and the through-hole 14c formed in the first base plate 14, as well as the through-hole 15c formed in the base plate 15, may be formed in the second base plate 32.

The engaging protruding bars 32b and 32d have, for example, a same shape, in which a splitting groove is formed at the central part of the extremity portion. The bars 32b and 32d are elastic, and each has a nail engaged with an edge of the through-hole 15c or 14c. The engaging protruding bar 32b is formed so as to protrude from the upper part of the second base plate 32 towards the first base plate 14. The engaging protruding bar 32d is formed so as to protrude from the lower part of the second base plate 32 towards the terminal plate 15.

The fixed knob 21 is secured to the fixed body 18 by engaging it with the engaging portion 18c of the fixed body 18 and by engaging the engaging piece 21a with the protruding piece 18c. In this way, the fixed knob 21, the fixed body 18, and the second lever 6 move in one body.

The pivoting knob 4 is secured to one end of the third lever 22, which has an operating rod 22a having a toothed wheel shape at the other end. The third lever 22 is inserted pivotably into the second lever 6. The pivoting knob 4 is secured to the third lever 22 by a pin 23 inserted into a hole 22d formed at the extremity portion of the lever 22. Specifically, in a state where the shaft bar 22c of the third lever 22 is inserted into the pipe-shaped portion 6a, and the hole 22d is arranged in a cavity 18d of the fixed body 18, the pin 23 is inserted into the hole 22d through a through-hole 4c formed in the pivoting knob 4.

The operating rod 22a has a toothed wheel shape, which is made in one body at an end of the third lever 22 or secured to the shaft. The operating rod 22a has a transmitting means in the form of a tooth-shaped gearing portion 22b having an approximately sector shape, as shown in FIG. 1. The gearing portion 22b at the extremity portion of the operating rod 22a protrudes obliquely downward with respect to the center line 12 of the third lever 22. When the first lever 3 is at the neutral position, as shown in FIG. 2, the operating rod 22a is engaged vertically with the gearing portion 34a having a toothed shape of the third movable piece 34.

When the pivoting knob 4 is operated in the directions indicated by the arrows G and H, the operating rod 22a is pivoted in directions indicated by arrows Y and Z to make the third movable piece 34 pivot in directions indicated by arrows N and P. Further, when the first lever 3 is operated in the directions indicated by the arrows C and D, the gearing portion 22b is engaged with a gearing portion 34a of the third movable piece 34 in an inclined state.

The third movable piece 34 is a tooth wheel-shaped pivoting member, and has the gearing portion 34a formed on an upper side outer periphery portion thereof. A shaft hole 34b is formed in the third movable piece 34 at the center. The third movable piece 34 is supported pivotably by the shaft owing to the fact that the shaft bar 32a of the second base plate 32 is inserted into the shaft hole 34b, and that the extremity of the shaft bar 32a is held pivotably in the shaft hole 14a of the first base plate 14. A movable contacting piece 35 made of electrically conductive metal plate spring material and having an approximately arc shape is secured to the third movable piece 34 around the shaft hole 34b. The movable contacting piece 35 is brought into contact with the fixed contacts 14d disposed on the first base plate 14, which correspond, for example, to the intermittent wiper, wiper low speed, and wiper high speed. The movable contacting piece 35 acts together with the fixed contacts 14d to switch them one after another when the third movable piece 34 is pivoted in the directions indicated by the arrows N and P.

The movable plate 24 is mounted on the inner bottom surface 1d of the case 1 and supported pivotably. A shaft portion 24d on the upper surface of the movable plate 24 is inserted into a shaft hole 50b formed in the cover member 50. When the first lever 3 is operated in the directions indicated by the arrows A and B, the movable plate 24 is pivoted in directions indicated by arrows I and J around the shaft portion 24d together with the second lever 6. The protrusion 24c, which is engaged with an engaging portion 37a of a fourth movable piece 37, is formed on the lower surface of the movable plate 24 so as to protrude therefrom. The fourth movable piece 37 holds movable contacting plates 39 through contact springs 38 on the lower surface thereof.

When the first lever 3 is operated by pivoting in the directions indicated by the arrows A and B, the movable plate 24 is pivoted in the directions indicated by the arrows I and J. Further, the fourth movable piece 37 is linked with the movable plate 24 and is moved in directions indicated by arrows S and T together with the movable contacting plate 39. The fourth movable piece 37 is put between the lower surface of the inner bottom surface 1d of the case 1 and the plate surface of the third base plate 40. The fourth movable piece 37 is guided by edges 40a of the plate surface of the third base plate 40 to move linearly in the directions indicated by the arrows S and T.

Engaging portions 37a consisting of two protruding pieces, between which the protrusion 24c is put, are formed on the fourth movable piece 37. Blind holes (not shown in the figures), into which contact springs 38 are inserted so that they can be freely taken-out, are formed in a lower surface portion of the fourth movable piece 37. The movable contacting plates 39 drive the turn indicator when they are brought into contact with fixed contacts 41 on the third base plate 40. In this way, turn indicator lights are lightened and extinguished.

The fixed contacts 41 and terminals electrically connected with the fixed contacts are secured to the third base plate 40 by insert formation, or the like. The third base plate 40 is engaged with a receiving portion 10c of the pole plate 10 so that the terminals 42 protrude downward from a lower surface of the pole plate 42.

Further, the opening portion 24e accommodating the base end portion 6c of the second lever 6 so that it can be pivoted by a desired angle is formed in the movable plate 24 on the side where the first lever 3 is disposed. A node body inserting pipe portion 24f is mounted on the movable plate 24 approximately on a side opposite to the opening portion 24e so as to protrude therefrom. A node spring 43 and a node body 44 are inserted into the node body inserting pipe portion 24f so that they can be freely taken out. The node body 44 supports a roller 45 contacted with pressure with a node groove 1b by a shaft at the extremity thereof.

The case 1 is closed on the upper surface thereof by securing the cover member 50 in place by means of screws or the like. The movable plate 24, a cancel cam 46, a plate spring 47, a cam guide 48, and a coil spring 49 are put between the case 1 and the cover member 50. The case 1 is closed on the lower surface thereof by the pole plate 10. The push rod 7, the first movable piece 8, a first base plate 14, the terminal plate 15, the second base plate 32, the third movable piece 34, the second movable piece 29, and so forth, are put between the case 1 and the pole plate 10. The case 1 accommodates the different parts described above and is engaged with the body and secured thereto by means of screws or the like.

The cancel cam 46 has shafts 46a on the upper and the lower surface. The shaft 46a on the lower side is inserted freely into a groove 24g of the movable plate 24, while the shaft 46a on the upper side is inserted freely into a long hole 50a formed in the cover member. The two ends of the plate spring 47 are held in the cover member 50 so that the plate spring 47 thrusts the cancel cam 46 at the middle part thereof to energize it. The cam guide 48 is mounted on the movable plate 24 and energized by the coil spring 49 towards the cancel cam 46. The cover member 50 is secured to the upper side opening end of the case 1 by insertion.

The construction of the lever switch according to the present invention is described above. The operation of the lever switch according to the present invention will now be described in further detail.

When the pivoting knob 4 is operated by pivoting in the direction indicated by the arrow G, the third lever 22, whose shaft is secured to the pivoting knob 4, is pivoted in the direction indicated by the arrow Y. The operating rod 22a is pivoted together therewith to make the third movable piece 34 pivot in the direction indicated by the arrow N.

The movable contacting piece 35 is pivoted together with the third movable piece 34 and brought into contact with the fixed contacts 14d to drive the wiper intermittently. Further, when the pivoting knob 4 is pivoted in the direction indicated by the arrow E, the different parts described above are pivoted to drive the wiper continuously with a low speed. When the pivoting knob 4 is operated further by pivoting in the direction indicated by the arrow E, the speed of the wiper is switched-over to a high speed.

The operating rod 22a formed on the third lever 22 and the gearing portion 34a formed on the third movable piece 34 are engaged with each other. Thus, even if the pivoting knob 4 is pivoted largely in the directions indicated by the arrows E and F, since the gearing portion 22b of the operating rod 22a and the gearing portion 34a of the third movable piece 34 are engaged with each other, the pivoting angle of the pivoting knob 4 can be great so that the number of the fixed contacts can be increased.

When the pivoting knob 4 is operated by pivoting in the direction indicated by the arrow H, the third lever 22 and the operating rod 22a are pivoted in the direction indicated by the arrow Z. The movable contacting piece 35 is pivoted in the direction indicated by the arrow P together with the third movable piece 34 engaged with the operating rod 22a so that the wiper switch is switched-over to a low speed position, an intermittent position, and an OFF position one after another. When the switch is returned to the OFF position, the wiper is stopped.

When the first lever is operated by raising in the direction indicated by the arrow C, the first lever 3, the second lever 6, and the third lever 22 are pivoted around the shaft portions 6d. When the third lever 22 is operated by pivoting in the directions indicated by the arrows C and D, since the part where the gearing portion 22b of the operating rod 22a and the gearing portion 34a of the third movable piece 34 are engaged with each other is long, they are never detached from each other. The contacting portion 27b of the arm body 27 is thrust to the thrusting surface 6f of the second lever 6, and the arm body 27 is pivoted in the direction indicated by the arrow T around the shaft portion 27a. The thrusting portion 27c of the contacting portion 27b is pivoted by an angle of θ(see FIG. 6) in the directions indicated by the arrows U and V around the shaft portion 27a with a radius of L2 from the shaft portion 27a to the thrusting portion 27c. When the thrusting portion 27b is pushed over a length of S1, the thrusting portion 27c is moved over a length of S2, which is greater than the length of S1. This movement is transmitted by the arm body 27 while enlarging the stroke of the thrusting surface 6f of the second lever 6. The second movable piece 29 descends largely in the direction indicated by the arrow Q to close or open the passing switch and the main-dimmer switch.

Since the stroke of the second movable piece 29 is long, the fixed contacts for passing 32c and the fixed contact 32c, with which the movable contacting plate 31 is brought into contact, can be arranged with a larger interval. In this way, defects in the contacts can be eliminated, and it is possible to reduce the overall size of the second movable piece 29 and the combination switch 2.

When the first lever 3 is operated in the direction indicated by the arrow A, the first lever 3, the second lever 6, the third lever 22, and the movable plate 24 are pivoted around the shaft portion 24d. When the third lever 22 is pivoted in the directions indicated by the arrows A and B, they are never detached from each other. This is because the part where the gearing portion 22b of the operating rod 22a and the gearing portion 34a of the third movable piece 34 are engaged with each other is long. The movable plate 24 is pivoted in the direction indicated by the arrow I to make the protrusion 24c formed on the lower surface thereof move the fourth movable piece 37 in the direction indicated by the arrow S.

The movable plate 24 is guided by the edges 40a of the third base plate 40 and moved linearly in the direction indicated by the arrow S to lighten and extinguish the turn indicator lamps. On the contrary, when the first lever 3 is operated in the opposite direction indicated by the arrow B, the different parts are moved in directions opposite to those when the first lever 3 is operated in the direction indicated by the arrow A.

When the first lever 3 is operated by pivoting in the direction indicated by the arrow E, the first lever 3 is pivoted around the center line of the third lever 22. The operating rod 3a is pivoted together with the first lever 3 in the direction indicated by the arrow E to make the push rod 7 descend. The push rod 7 makes the first movable piece 8 and the movable contacting plate 12 descend in the direction indicated by the arrow K and brings the movable contacting plate 12 into contact with the fixed contacts 14e to drive the wiper washer.

When the hand is separated from the first lever 3, the steel ball 17 energized by the node spring 16 is moved while being guided by the fixed body 18 so that the first lever 3 returns to the initial OFF position. The push rod 7 and the first movable piece 8 return to their initial OFF positions, energized by the returning spring 9, and the wiper washer is thereby stopped.

When the third movable piece 34 is mounted, the third movable piece 34 is supported by a shaft by inserting the welded portion 15b of the terminal plate 15 into the through-hole 14b; inserting the shaft bar 32a of the second base plate 32 into the third movable piece 34; inserting the shaft bar 32a into the shaft hole 14a; inserting the engaging protruding bar 32b into the through-hole 15c; and inserting the engaging protruding bar 32d into the through-hole 14c.

The third movable piece 34 can be mounted easily by inserting the shaft bar 32a into the shaft hole 34b and by supporting the shaft bar 32a by the shaft hole 14a. By engaging extremities of the shaft bar 32a, the engaging protruding bars 32b and 32d disposed at the upper and the lower part of the second base plate 32 with the shaft holes and the through-holes 15c and 14c, the second base plate 32, and the first base plate 14, are positioned and mounted parallel to each other so that the third movable piece 34 is pivoted stably. In addition, the second base plate 32 and the first base plate 14 are positioned with respect to each other, and the fixed contacts 14d, 14e and 32c are positioned correctly.

The first base plate 14 and the second base plate 32 can be arranged with a high efficiency within the pole plate 10. A space saving is achieved by mounting the first and second base plates 14, 32 to stand parallel with respect to each other. The first movable piece 8, the third movable piece 34, the second movable piece 29, and so forth, are disposed on the front side and the rear side surface of the second base plate 32.

Since the present invention is constructed as explained above, the following advantages and effects can be obtained.

According to the invention, a lever switch for a vehicle is provided having a lever mounted pivotably on a case, and a movable piece moved by pivoting movement of the lever. The lever switch comprises an arm body disposed between the case and the movable piece, in which arm body there are a shaft portion supported pivotably by the case at one end, a thrusting portion driving the movable piece at the other end, and a contacting portion brought into contact with the lever at an approximately central part thereof. With the lever switch according to the present invention, it is possible to transmit a greater displacement of the thrusting surface of the lever to the movable piece.

Further, according to the present invention, the arm body includes a first arm, at an extremity of which the shaft portion is disposed; a second arm, at an extremity of which the contacting portion is disposed; and a third arm, at an extremity of which the thrusting portion is disposed. As a result, it is possible to transmit a greater displacement of the thrusting surface of the lever to the movable piece and to elongate the stroke of the movable piece. Therefore, it is possible to reduce the number of contact defects produced.

Further, according to the present invention, it is possible to enlarge the stroke of the movable piece efficiently by constructing the arm body in a particular manner. Specifically, the arm body is constructed so that the shaft portion is disposed in an approximately horizontal direction from a nearly central portion, the contacting portion is disposed in an approximately vertical direction from the nearly central point, and the thrusting portion is formed in an inclined direction from the nearly central point.

Moreover, displacement of the movable piece can be longer than displacement of the thrusting surface of the lever by constructing the arm body so that L1 <L2, where L1 denotes a length from the shaft portion to the contacting portion, and L2 denotes a length from the shaft portion to the thrusting portion.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch assembly for a vehicle, having a lever mounted pivotably on a case and a movable piece moved by pivoting movement of said lever, the lever switch assembly comprising:

an arm body disposed between said case and said movable piece, in which arm body there are a shaft portion supported pivotably be said case at one end, a thrusting portion driving said movable piece at the other end, and a contacting portion brought into contact with said lever at an approximately central part of said arm body;

wherein said arm body comprises a first arm, at an extremity of which said shaft portion is disposed, a second arm, at an extremity of which said contacting portion is disposed, and a third arm, at an extremity of which said thrusting portion is disposed.

2. The lever switch assembly for a vehicle according to claim 1, wherein, in said arm body, said shaft portion is disposed in an approximately horizontal direction from a nearly central point, said contacting portion is disposed in an approximately vertical direction from said nearly central point, and said thrusting portion is formed in an inclined direction from said nearly central point.

3. The lever switch assembly for a vehicle according to claim 2, wherein, in said arm body, said arm body is constructed such that L1 <L2, where L1 denotes a length from said shaft portion to said contacting portions and L2 denotes a length from said shaft portion to said thrusting portion.

4. The lever switch assembly for a vehicle according to claim 1, wherein, in said arm body, said arm body is constructed such that L1 <L2, where L1 denotes a length from said shaft portion to said contacting portion, and L2 denotes a length from said shaft portion to said thrusting portion.

5. A lever switch assembly for a vehicle, having a lever mounted pivotably on a case and a movable piece moved by pivoting movement of said lever, the lever switch assembly comprising:

an arm body disposed between said case and said movable piece, in which arm body there are a shaft portion supported pivotably by said case at one end, a thrusting portion driving said movable piece at the other end, and a contacting portion brought into contact with said lever at an approximately central part of said arm body:

wherein, in said arm body, said shaft portion is disposed in an approximately horizontal direction from a nearly central point, said contacting portion is disposed in an approximately vertical direction from said nearly central point, and said thrusting portion is formed in an inclined direction from said nearly central point.

6. A lever switch assembly for a vehicle, comprising:

a lever mounted pivotably on a case;

a movable piece arranged so as to be moved linearly upon pivoting movement of said lever; and an arm body disposed between said case and said movable piece, said arm body comprising a shaft portion disposed at a first end, a thrusting portion disposed at a second end, and a contacting portion disposed intermediate said first and second ends, said shaft portion being supported pivotably by said case, said thrusting portion engaging said movable piece, and said contacting portion being contacted by said lever such that pivotal movement of said lever causes pivotal movement of said arm body and linear movement of said movable piece, wherein said arm body comprises a first arm, at an extremity of which said shaft portion is disposed, a second arm, at an extremity of which said contacting portion is disposed, and a third arm, at an extremity of which said thrusting portion is disposed.

7. The lever switch assembly for a vehicle according to claim 6, wherein said arm body is constructed such that L1 <L2, where L1 denotes a length from said shaft portion to said contacting portion, and L2 denotes a length from said shaft portion to said thrusting portion.

8. A lever switch assembly for a vehicle, comprising:

a lever mounted pivotably on a case;

a movable piece arranged so as to be moved linearly upon pivoting movement of said lever; and an arm body disposed between said case and said movable piece, said arm body comprising a shaft portion disposed at a first end, a thrusting portion disposed at a second end, and a contacting portion disposed intermediate said first and second ends, said shaft portion being supported pivotably by said case, said thrusting portion engaging said movable piece, and said contacting portion being contacted by said lever such that pivotal movement of said lever causes pivotal movement of said arm body and linear movement of said movable piece, wherein said contacting portion is disposed at an extremity of an arm of said arm body.

9. The lever switch assembly for a vehicle according to claim 6, wherein said lever is mounted pivotably on said case about a first axis, said shaft portion of said arm body is supported by said case for pivoting movement about a second axis, and said contacting portion of said arm body is disposed generally between said first and second axes.

* * * * *